United States Patent [19]
Avery et al.

[11] Patent Number: 6,117,041
[45] Date of Patent: Sep. 12, 2000

[54] SELF-ALIGNING CANTILEVER CARRIER

[75] Inventors: Bennett W. Avery, Princeville; Laurence J. Cobb; Valerie R. Wiest, both of Peoria, all of Ill.

[73] Assignee: Caterpillar Inc., Peoria, Ill.

[21] Appl. No.: 09/330,947

[22] Filed: Jun. 11, 1999

[51] Int. Cl.[7] .................................................. F16H 3/44
[52] U.S. Cl. ............................................................ 475/347
[58] Field of Search ..................................... 475/346, 347

[56] References Cited

U.S. PATENT DOCUMENTS

| | | | |
|---|---|---|---|
| 3,303,713 | 2/1967 | Hicks | 475/347 |
| 3,943,787 | 3/1976 | Hicks | 475/347 |
| 4,104,932 | 8/1978 | Hansson | 475/347 |
| 4,719,818 | 1/1988 | McCreary | 74/750 |
| 4,885,959 | 12/1989 | Shinjo et al. | 475/347 |
| 4,955,852 | 9/1990 | Morisawa | 475/146 |
| 5,368,528 | 11/1994 | Farrell | 475/348 |
| 5,567,056 | 10/1996 | Blase et al. | 384/286 |

*Primary Examiner*—Dirk Wright
*Attorney, Agent, or Firm*—Howard & Howard; Jeffrey L. Myers

[57] ABSTRACT

A planetary gear set is disclosed that includes self-aligning carrier shafts for the planetary gears that greatly reduces the wear to the carrier shaft caused by torque-induced loads on the planetary gear set. The carrier shaft includes a first cantilevered member extending from a carrier deck, which is connected, to a second cantilevered member that extends toward the carrier deck. A bearing member of the planetary gear is mounted to the second cantilevered member and the planetary gear is mounted to the bearing member. Under a torque-induced load on the planetary gear, the first cantilevered member is deflected in a first direction and the second cantilevered member is deflected in a second direction opposite the first direction, thus a carrier shaft designed in accordance with the present invention enables offsetting deflections under torque-induced loads leading to a reduction in the wear of the bearing member and the carrier shaft. The disclosed carrier shaft further permits a planetary gear system that utilizes a single carrier deck rather than dual carrier decks.

20 Claims, 2 Drawing Sheets

SELF-ALIGNING CANTILEVER CARRIER

TECHNICAL FIELD

This invention relates generally to a planetary gear set and, more specifically, to a carrier shaft for mounting a planetary gear to a carrier deck.

BACKGROUND ART

Planetary gear sets are well known. The basic planetary gear set includes a centrally located sun gear surrounded by a series of planetary gears that mesh with the sun gear. A ring gear meshes with the planetary gears. The sun gear is rotatably fixed to a shaft and rotation of the shaft drives the sun gear, which in turn drives the planetary gears, which drive the ring gear. Typically, the planetary gears are mounted to carrier shafts and are freely rotatable about their respective carrier shaft. The carrier shafts are either captured between a pair of carrier decks, thus enclosing the planetary gear set, or the carrier shafts extend from a single carrier deck. Generally, a bearing member is located between each planetary gear and the carrier shaft that carries the planetary gear.

When the planetary gear set is placed under torque, a load acts on the carrier shaft in a direction that is generally perpendicular to the longitudinal axis of the carrier shaft. This load causes wear of the bearing member and the carrier shaft. In planetary gear sets comprising only a single deck carrier wherein one end of the carrier shaft is free the load produced by torque causes a deflection of the carrier pin because the carrier shaft acts as a cantilevered member. This causes further wear of the bearing member and the carrier shaft.

Additionally, planetary gears are typically designed such that the teeth of the gear have a crowned shape to them. This crowned shape is necessary in order to aid in proper meshing of the planetary gear with the sun gear when the planetary gear system is under a torque load and also to keep the planetary gear centered on its carrier shaft. This crowning is difficult and expensive to use.

It would be advantageous to design a planetary gear set wherein the torque induced loads on the carrier shaft are reduced thus leading to a longer life of the carrier shaft and the planetary gear bearing member. In addition, it would be advantageous to produce such a planetary gear set that could be implemented using a single carrier deck. Finally, it would be advantageous to produce a planetary gear set that would permit a reduction in the crown on the teeth of the planetary gears while still maintaining the centering of the planetary gears on their carrier shafts.

The present invention is directed to overcoming one or more of the problems set forth above.

DISCLOSURE OF THE INVENTION

In one aspect of the present invention, a carrier deck for a planetary gear set is disclosed. The carrier deck includes a plurality of carrier shafts each for receiving a planetary gear and each of which extends from the carrier deck. Each of the carrier shafts includes an upper shaft connected to a lower shaft, which is secured to the carrier deck. The upper shaft includes an outer sleeve connected to a central post. The central post connects the upper shaft to the lower shaft with the outer sleeve encircling the central post and a portion of the lower shaft.

In another aspect of this invention, a method for mounting a planetary gear to a carrier deck of a planetary gear set is disclosed. The method includes the steps of extending a first cantilevered member from a carrier deck, securing a second end of a second cantilevered member to the first cantilevered member and extending a first end of the second cantilevered member opposite the second end toward the carrier deck, and mounting a planetary gear to the second cantilevered member in a freely rotatable manner.

BRIEF DESCRIPTION OF THE DRAWINGS

For a better understanding of the present invention, reference may be made to the accompanying drawings in which.

BEST MODE FOR CARRYING OUT THE INVENTION

Figure 1:
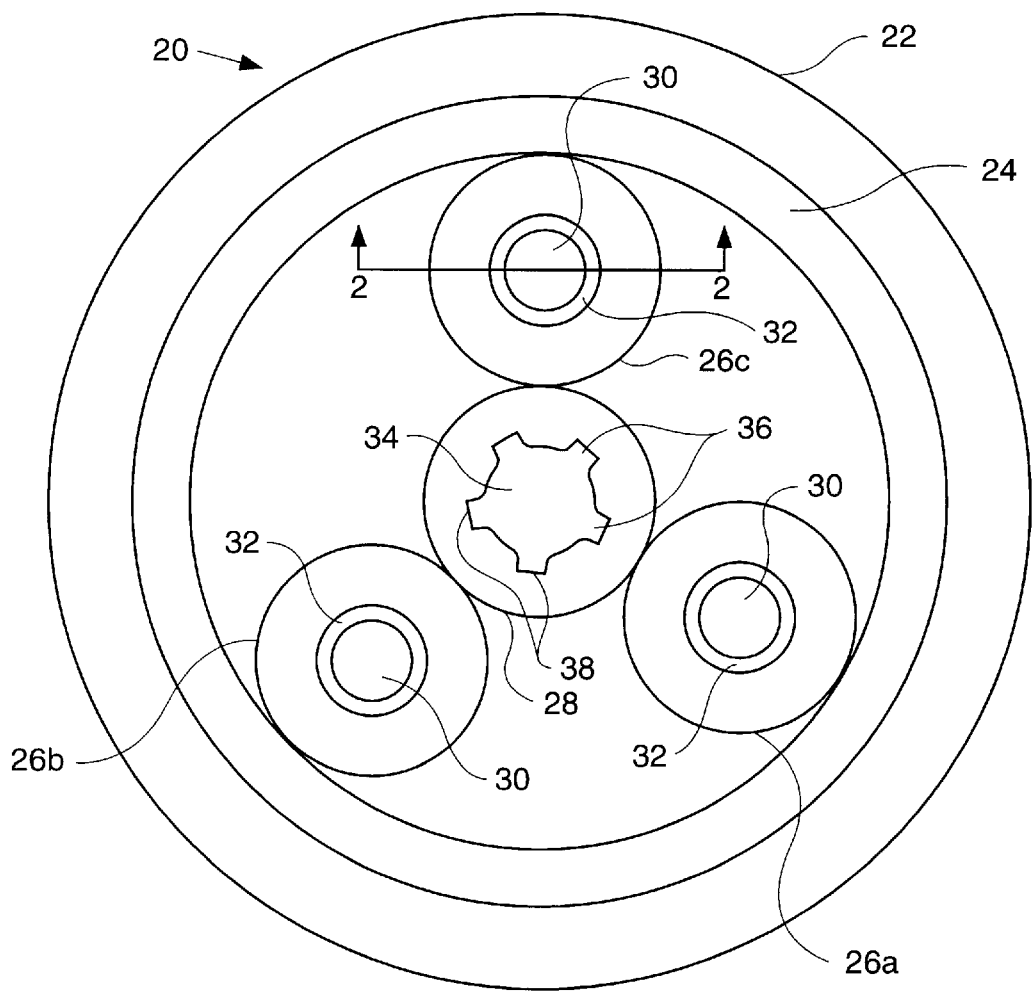
FIG. 1 is a top plan view of a schematic representation of a planetary gear set designed in accordance with the present invention.

Referring now to the drawings and initially to FIG. 1, a highly schematic view of a planetary gear set is illustrated and is shown generally by numeral 20. Planetary gear set 20 includes a carrier deck 22. A sun gear 28 is centrally mounted on the carrier deck 22 and is surrounded by a plurality of planetary gears 26a–26c. Planetary gears 26a–26c mesh with sun gear 28. A ring gear 24 surrounds planetary gears 26a–26c and meshes with planetary gears 26a–26c. Each of the planetary gears 26a–26c are mounted to a carrier shaft 30. A bearing member 32 is located between each carrier shaft 30 and its respective planetary gear 26a–26c. Sun gear 28 is mounted to a sun shaft 34. Sun shaft 34 generally includes a plurality of splines 36 that are received in a plurality of keyways 38 located in sun gear 28. Thus, sun gear 28 is rotatably fixed to sun shaft 34. Rotation of sun shaft 34 rotates sun gear 28, planetary gears 26a–26c and ring gear 24.

The planetary gear set 20, shown in FIG. 1, is highly schematic and serves only to illustrate the basic components of a planetary gear set. As will be understood by one of ordinary skill in the art, in actual practice planetary gear set 20 would include numerous other components not shown in FIG. 1.

Figure 2:
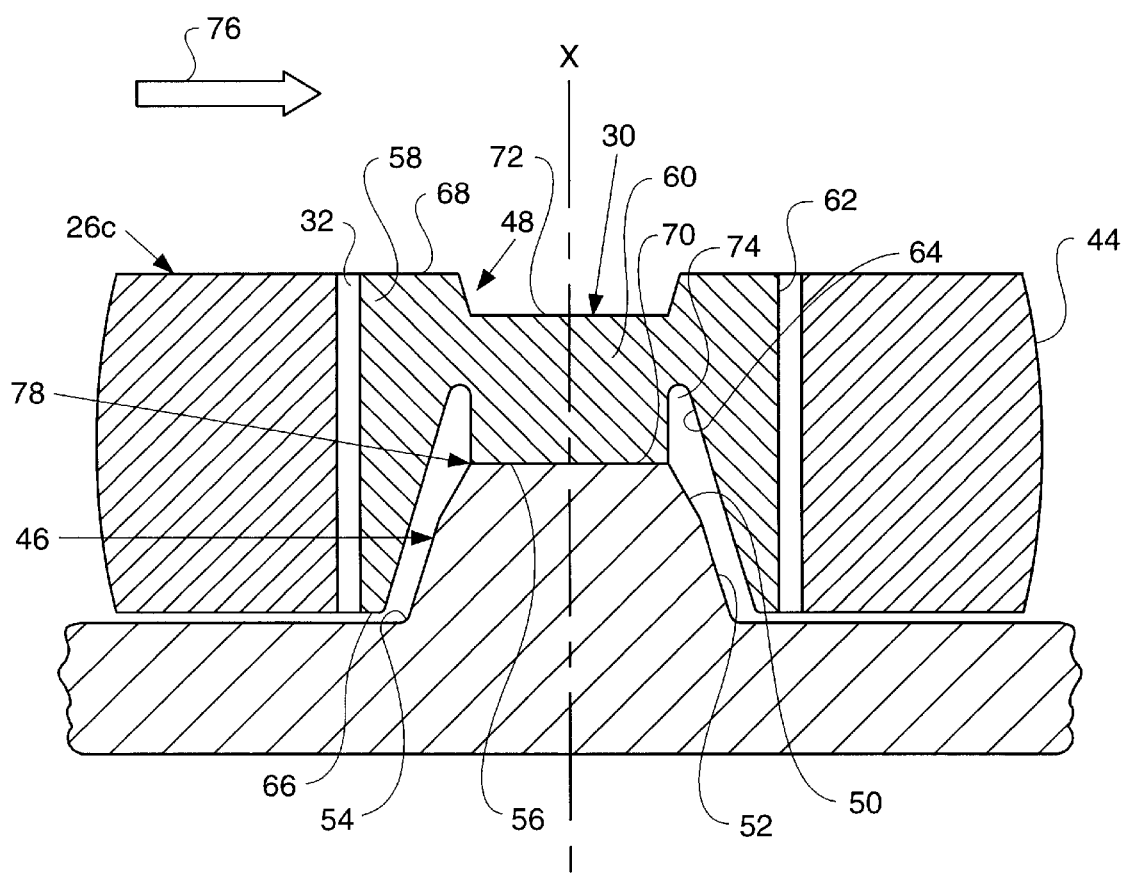
FIG. 2 is a cross-sectional view along Line 2—2 of FIG. 1.

FIG. 2 is a cross-sectional view along Line 2—2 of FIG. 1. Planetary gear 26c includes a plurality of teeth 44 having a slight crown to the teeth. Carrier shaft 30 includes a lower shaft 46 connected to an upper shaft 48.

Lower shaft 46 includes a first beveled surface 50 and a second beveled surface 52. Second beveled surface 52 extends from a second end 54 of lower shaft 46 toward a first end 56 of lower shaft 46. First beveled surface 50 extends from first end 56 of lower shaft 46 toward second end 54 of lower shaft 46. A longitudinal axis of carrier shaft 30 is represented by the line labeled X. First beveled surface 50 is at a greater angle with respect to longitudinal axis X than is second beveled surface 52. Preferably, as shown, lower shaft 46 is formed integrally from carrier deck 22 such that first end 56 of lower shaft 46 extends outward from carrier deck 22 and second end 54 of lower shaft 46 is integral with carrier deck 22.

Upper shaft 48 includes an outer sleeve 58 and a central post 60. Outer sleeve 58 includes an outer surface 62 opposite an inner surface 64. Outer sleeve 58 also includes a first end 66 opposite a second end 68. The diameter of outer surface 62 is relatively constant between first end 66 and second end 68. The diameter of inner surface 64 decreases between first end 66 and second end 68 of outer sleeve 58. Thus, inner surface 64 defines an interior space 74 that is generally cone-shaped.

Central post 60 includes a first end 70 opposite a second end 72. First end 70 of central post 60 is connected to first end 56 of lower shaft 46. Outer sleeve 58 is preferably integral with central post 60. As shown, second end 72 of central post 60 is integral with outer sleeve 58 adjacent second end 68 of outer sleeve 58.

Preferably, first end 56 of lower shaft 46 is connected to upper shaft 48 by being inertia welded to first end 70 of central post 60. Interior space 74 receives lower shaft 46 and additionally, provides a space for welding flash when lower shaft 46 is welded to upper shaft 48.

Thus, carrier shaft 30 includes a first cantilevered member 78 comprising lower shaft 46 and central post 60 and a second cantilevered member comprising outer sleeve 58. The first cantilevered member 78 is connected to and extends from carrier deck 22, as shown in FIG. 1, while the second cantilevered member, outer sleeve 58, is connected to the first cantilevered member 78 and extends toward carrier deck 22. The first end 66 of the outer sleeve 58 is spaced from the carrier deck 22.

In the design, as shown in FIG. 2, when the planetary gear 26c is under a torque-induced load the load acts generally in the direction of arrow 76. The load will cause outer sleeve 58 to rotate in a counter-clockwise direction relative to FIG. 2 and cause the first cantilevered member 78 to rotate in a clockwise direction relative to FIG. 2. The rotation of the first cantilevered member 78 and the second cantilevered member will generally offset each other thus reducing the load on bearing member 32 and carrier shaft 30. An added benefit of a carrier shaft 30 designed in accordance with the present invention is that it enables a reduction of the crown necessary on planetary gear teeth 44. In fact, planetary gear teeth 44 can be produced with virtually no crown when carrier shaft 30 is used.

Industrial Applicability

The present invention utilizes a carrier shaft 30 for use in a planetary gear set 20. Planetary gear set 20 generally includes a carrier deck 22 from which extend a plurality of carrier shafts 30. Carrier shafts 30 are utilized for mounting planetary gears 26a–26c to carrier deck 22. Each carrier shaft 30 includes a first cantilevered member 78 that is secured at one end to the carrier deck 22 and extends from carrier deck 22. A second cantilevered member, comprising an outer sleeve 58, is secured to the free end of the first cantilevered member 78 and extends toward carrier deck 22. A carrier shaft 30 designed in accordance with the present invention enables a bearing member 32 to be mounted to the carrier shaft 30 and a planetary gear 26a to be mounted to bearing member 32. Because of the design of carrier shaft 30, when planetary gear 26a is placed under a torque-induced load offsetting deflections of first cantilevered member 78 and outer sleeve 58 are produced. These offsetting deflections greatly reduce the wear of bearing member 32, carrier shaft 30, and the need for designing planetary gear 26a to have highly crowned teeth. In addition, this design permits a reduction in weight and cost of the planetary gear set 20, because it can be utilized in a planetary gear set 20 having only a single carrier deck 22 rather than a pair of carrier decks. A planetary gear set 20 designed in accordance with the present invention is useful in all forms of machinery using planetary gears.

Other aspects, objects and advantages of the present invention can be obtained from a study of the drawings, the disclosure and the appended claims.

What is claimed is:

1. A carrier deck for a planetary gear set comprising:
   a carrier deck having a plurality of carrier shafts each for receiving a planetary gear and each extending from said carrier deck;
   each of said carrier shafts comprising an upper shaft connected to a lower shaft secured to said carrier deck;
   said upper shaft having an outer sleeve connected to a central post;
   said central post connecting said upper shaft to said lower shaft with said outer sleeve encircling said central post and a portion of said lower shaft; and
   wherein said central post includes a first end opposite a second end, said outer sleeve includes a first end opposite a second end, and said second end of said outer sleeve is connected to said central post adjacent said second end of said central post; and
   wherein said outer sleeve includes an inner surface having a diameter that decreases between said first end and said second end of said outer sleeve, said inner surface defining a generally cone-shaped interior space inside said outer sleeve, and said lower shaft received in said cone-shaped interior space.

2. A carrier deck as recited in claim 1, wherein said lower shaft is formed integrally with said carrier deck thereby securing said lower shaft to said carrier deck.

3. A carrier deck as recited in claim 1, wherein said central post includes a first end opposite a second end and said first end of said central post is welded to a first end of said lower shaft, thereby connecting said upper shaft to said lower shaft.

4. A carrier deck as recited in claim 3, wherein said first end of said central post is inertia welded to said first end of said lower shaft.

5. A carrier deck as recited in claim 1, wherein said outer sleeve includes an outer surface having a relatively constant diameter between said second end and said first end of said outer sleeve.

6. A carrier deck as recited in claim 1, wherein said outer sleeve is formed integrally with said central post, said upper shaft thereby comprising a unitary piece.

7. A carrier deck as recited in claim 1, wherein said second end of said outer sleeve extends beyond said second end of said central post, said first end of said outer sleeve extends beyond said first end of said central post, and said first end of said outer sleeve is spaced from said carrier deck when said upper shaft is connected to said lower shaft.

8. A carrier deck as recited in claim 1 further comprising a bearing member mounted to said outer sleeve, a planetary gear mounted to said bearing member, and said planetary gear is freely rotatable about said outer sleeve.

9. A carrier deck as recited in claim 1, wherein said lower shaft includes a first beveled surface adjacent a second beveled surface, said first beveled surface extending from a first end of said lower shaft and said second beveled surface extending from a second end of said lower shaft opposite said first end of said lower shaft, and said first beveled surface at a greater angle relative to a longitudinal axis of said carrier shaft than said second beveled surface.

10. A carrier deck for a planetary gear set comprising:
    a carrier deck having a plurality of carrier shafts each for receiving a planetary gear and each of said carrier shafts comprising a first cantilevered member and a second cantilevered member;

said first cantilevered member secured to said carrier deck and extending from said carrier deck;

said second cantilevered member having a first end opposite a second end, said second cantilevered member secured to said first cantilevered member adjacent said second end of said second cantilevered member and opposite said carrier deck, and said first end of said second cantilevered member extending toward said carrier deck; and wherein said second cantilevered member includes an outer sleeve; and wherein said outer sleeve includes an inner surface having a diameter that decreases between said first end and said second end of said second cantilevered member, said inner surface defining a generally cone-shaped interior space inside said second cantilevered member, and said lower shaft received in said cone-shaped interior space.

11. A carrier deck as recited in claim 10, wherein said first cantilevered member includes a lower shaft connected to a central post, said lower shaft secured to said carrier deck by being formed integrally with said carrier deck and said lower shaft having a first end extending from said carrier deck, said first end of said lower shaft connected to a first end of said central post, and said second cantilevered member connected to a second end of said central post, said second end of said central post opposite said first end of said central post.

12. A carrier deck as recited in claim 11, wherein said first end of said central post is welded to said first end of said lower shaft, thereby connecting said lower shaft to said central post.

13. A carrier deck as recited in claim 12, wherein said first end of said central post is inertia welded to said first end of said lower shaft.

14. A carrier deck as recited in claim 10, wherein said outer sleeve includes an outer surface having a relatively constant diameter between said second end and said first end of said second cantilevered member.

15. A carrier deck as recited in claim 10, wherein said outer sleeve is formed integrally with a portion of said first cantilevered member, thereby securing said second cantilevered member to said first cantilevered member.

16. A method for mounting a planetary gear to a carrier deck of a planetary gear set comprising the steps of:

extending a first cantilevered member from a carrier deck;

securing a second end of a second cantilevered member to the first cantilevered member and extending a first end of the second cantilevered member opposite the second end toward the carrier deck, and forming said second cantilevered member as an outer sleeve that includes an inner surface having a diameter that decreases between said first end and said second end of said second cantilevered member; and mounting a planetary gear to the second cantilevered member in a freely rotatable manner.

17. A method as recited in claim 16, wherein the step of extending a first cantilevered member from a carrier deck further includes forming the first cantilevered member as a lower shaft that is integrally formed from the carrier deck and that extends from the carrier deck, and the lower shaft is further connected to a central post to form the first cantilevered member.

18. A method as recited in claim 17, wherein the step of connecting the central post to the lower shaft further includes welding the central post to the lower shaft.

19. A method as recited in claim 17, wherein the step of securing a second end of a second cantilevered member to the first cantilevered member further includes forming said second cantilevered member as an outer sleeve that is integral with the central post.

20. A method as recited in claim 16 wherein the step of mounting a planetary gear to the second cantilevered member in a freely rotatable manner further includes the steps of mounting a bearing member to the second cantilevered member and mounting a planetary gear to the bearing member.

* * * * *